(12) United States Patent
Malkin et al.

(10) Patent No.: US 8,913,626 B2
(45) Date of Patent: Dec. 16, 2014

(54) SIGNAL PROCESSING OF MULTIPLE STREAMS

(75) Inventors: Moshe Malkin, Mountain View, CA (US); Dimitry Taich, Cupertino, CA (US); Jose Tellado, Mountain View, CA (US)

(73) Assignee: Entropic Communications, Inc., San Diego, CA (US)

( * ) Notice: Subject to any disclaimer, the term of this patent is extended or adjusted under 35 U.S.C. 154(b) by 85 days.

(21) Appl. No.: 13/471,613

(22) Filed: May 15, 2012

(65) Prior Publication Data

US 2013/0308656 A1    Nov. 21, 2013

(51) Int. Cl.
*H04J 3/16*    (2006.01)

(52) U.S. Cl.
USPC ........... 370/437; 370/445; 370/317; 370/318; 375/285; 375/296; 455/80; 455/88; 455/67.11; 455/522

(58) Field of Classification Search
USPC ......... 370/480, 230, 229, 329, 330, 319, 320, 370/321, 437, 445, 431, 317, 318; 455/80, 455/88, 101; 375/267, 295, 296, 285, 297
See application file for complete search history.

(56) References Cited

U.S. PATENT DOCUMENTS

| | | | |
|---|---|---|---|
| 8,369,801 B2 | 2/2013 | Shimizu et al. | |
| 8,385,834 B2 | 2/2013 | Nakata | |
| 2009/0080454 A1* | 3/2009 | Koyanagi | 370/445 |
| 2009/0097581 A1* | 4/2009 | McCallister et al. | 375/260 |
| 2009/0310658 A1 | 12/2009 | Garg et al. | |
| 2009/0310704 A1 | 12/2009 | Jethanandani et al. | |
| 2010/0029320 A1* | 2/2010 | Malladi et al. | 455/522 |
| 2011/0096657 A1* | 4/2011 | Luo et al. | 370/203 |
| 2011/0158336 A1 | 6/2011 | Jiang | |
| 2011/0255622 A1* | 10/2011 | van Veen et al. | 375/260 |
| 2011/0268167 A1* | 11/2011 | Sundstrom | 375/224 |
| 2012/0224517 A1* | 9/2012 | Yun et al. | 370/310 |

\* cited by examiner

*Primary Examiner* — Dady Chery

(74) *Attorney, Agent, or Firm* — Richard Bachand; Bruce Greenhaus

(57) ABSTRACT

Embodiments of methods, apparatuses, and systems for signal processing of multiple input signals to control peak amplitudes of a combined signal are disclosed. One method includes receiving a plurality of input signals, generating a combined signal, the combined signal comprising a plurality of sub-channels, wherein each sub-channel includes a representation of at least a portion of at least one of the plurality of input signals, and processing the representation of the least a portion of the at least one of the plurality of input signals of at least one of the sub-channels, to reduce a peak-to-average-power ratio (PAR) of the combined signal.

32 Claims, 11 Drawing Sheets

SIGNAL PROCESSING OF MULTIPLE
STREAMS

FIELD OF THE DESCRIBED EMBODIMENTS

The described embodiments relate generally to signal processing. More particularly, the described embodiments relate to methods and apparatuses for signal processing of multiple streams to control peak amplitudes of a combined signal.

BACKGROUND

Modern data multiplexing or streaming systems tremendously simplify the processing and/or delivery of multiple information streams to home entertainment systems. Such data multiplexing/streaming requires sophisticated systems to handle the variety of scenarios such multiplexing systems need to support.

The required aggregation of multiple data-streams/channels presents significant requirements on the signal processing elements of the multiplexing and streaming device. Prior solutions are inefficient in terms of the required device cost, size, power consumption, flexibility, the multiplexed streams' fidelity, and the quality of the processed streams in challenging scenarios.

A special situation arises if the stream to be delivered to different destinations such as, for example, different entertainment centers, is the same. Such a situation might manifest itself by a stream being replicated across multiple channels, such as a stream being replicated multiple times in the frequency domain. Such a replication of a sub-stream across multiple sub-channels results in worst excursion signal levels of the combined stream and can result in saturation, clipping, and distort the signal delivered to the home entertainment system. Such peak amplitude excursion issues are sometime known as peak-to-average power (PAR) problems. Such large signal excursions can occur because the same sub-stream is replicated, which results in a very structured, non-random, signal amplitude variations. Such structured processed signal could result in very large signal excursions in some transform domain, and so the processing elements, digital or analog, would need to support a very large dynamic range for the processed stream or significant clipping distortion and saturation would plague the processed stream.

It is desirable to have an apparatus, method, and system for mitigating large peaks associated with the distribution of streams that are replicated multiple times across multiple sub-channels

SUMMARY

An embodiment includes a method of processing input signals. The method includes receiving a plurality of input signals, generating a combined signal, the combined signal comprising a plurality of sub-channels, wherein each sub-channel includes a representation of at least a portion of at least one of the plurality of input signals, and processing the representation of the least a portion of the at least one of the plurality of input signals of at least one of the sub-channels, to reduce a peak-to-average-power ratio (PAR) of the combined signal.

Another embodiment includes an apparatus for processing input signals. The apparatus includes a channel translator configured to receive a plurality of input signals and generates a combined signal, wherein the combined signal includes a plurality of sub-channels, wherein each sub-channel includes a representation of at least a portion of at least one of the plurality of input signals. The apparatus further includes signal processing circuitry configured to process the representation of the least a portion of the at least one of the plurality of input signals of at least one of the sub-channels to reduce a peak-to-average-power ratio (PAR) of the combined signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

Figure 1:
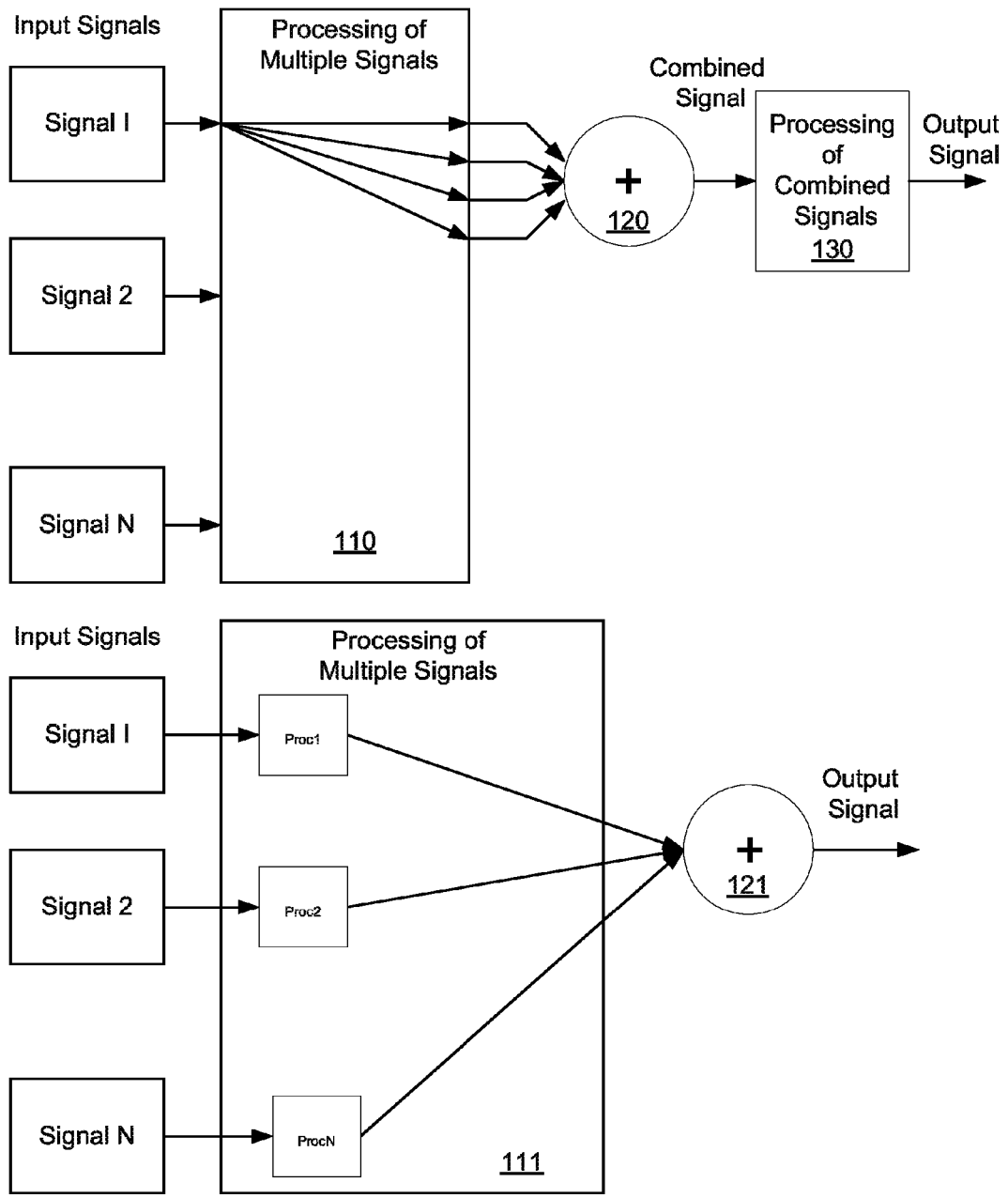
FIG. 1 shows examples of two different high-level block diagrams of embodiments of processing multiple input signals to generate an output signal that includes multiple replicates of the input signal, wherein each replicate occupies a different sub-channel of the output signal.

As shown in the drawings for purposes of illustration, the described embodiments include apparatuses, methods and systems for reducing the peak excursion of a stream that includes a plurality of replicated sub-streams. The reduction in the peak excursion of the stream results in smaller signal amplitude excursions which result in less clipping and distortion, and/or in processing elements supporting smaller dynamic ranges. Additionally, embodiments of the reduction in the peak excursion of the stream allows for simplified processing circuitry, and provides for improvements in the cost, area, and power of a multi-stream processing system.

One possible method to reduce the signal peak amplitude is to reduce the power of the signal by simple scaling. However, such scaling also reduces the power of the signal, which must be maintained above a threshold because of other constraints, making such a simple scaling solution not always applicable. Moreover, reducing the signal amplitude and power by scaling at various processing stages makes the signal more susceptible to other noises such as quantization, cross-talk, interference, etc., that degrade the signal's fidelity and result in worst system performance.

The disclosed embodiments provide for reductions in signal peak amplitude with simple processing modifications without significantly affecting the average power of the processed stream, thus resulting in efficient methods of Peak-to-Average-Power (PAR) reduction. These simple approaches for reducing the signal peak excursions result in less distortion and processing elements that are less expensive and more efficient in terms of power, area, cost, complexity, etc. Moreover, the disclosed embodiments do not require any additional materials and are compatible with many possible deployments.

FIG. 1 shows examples of two different high-level block diagrams 110, 111 of embodiments of processing multiple input signals to generate an output signal that includes multiple replicates of the input signal, wherein each replicate occupies a different sub-channel of the output signal. The first processing block 110 provides for a processing of multiple replicas of a single input signal (for example, Signal 1 of the multiple input signals Signal 1, Signal 2, . . . Signal N), providing the generation of a combined signal (combiner or summer 120) which is then processed by a processing block 130 to reduce the PAR of an output signal. The second processing block 111 provides for processing of multiple inputs (for example, input signals Signal 1, Signal 2, . . . Signal N) which are then combined (combiner or summer 121) to provide the output signal. The processing of each of the multiple inputs reduces the PAR of the combined output signal.

While a single output is shown for each of the block diagrams of FIG. 1, it is to be understood that there can be as many output signal streams as desired, wherein each output is some combination of any possible combination of processed input signals.

For embodiments, each output includes a single output stream that includes multiples channels. For an embodiment, each channel is defined by a frequency channel. However, channels can also be defined by other structures and other transform domains. Many other transform domains with multiple sub-channels are possible. An example of such transformations includes the discrete-Fourier-transform (DFT), discrete-Hartley-transform (DHT), discrete-Cosine-transform (DCT), discrete-Wavelet-transform (DWT), other wavelet basis, filter-banks channelizations, etc. Moreover, the transform can be a multi-dimensional transform such as, for example, the multi-dimensional—Fourier-transforms or the multi-dimensional wavelet transforms.

For at least one embodiment, the combiners 110, 111 include a summation or addition. However, the combiners can alternatively include other forms of combining signals, such as modulating the signals on different channels, or modulating the signals on some other sub-channelization structures. Other methods include frequency modulation of the sub-channels onto different frequencies. Moreover, the combination of signals can be carried out through any of the transforms mentioned above.

For the embodiment in FIG. 1, two methods are shown of processing to reduce the PAR. In a first of the two embodiments shown in FIG. 1, multiple signals are combined using the combining device 120 to result in a combined signal that is processed by processing 130 to reduce the PAR of the combined signal. Some PAR reduction processing methods work better when operating on the combined signal instead of operating on the sub-signals comprising the combined signal. Other PAR reduction methods are suitable to be applied on sub-signals that are combined to generate the combined signal. One such embodiment is shown in by the processing performed in 111, where each of the representations of at least a portion of input Signal 1 is processed individually such that the output signal after combination 121 would have a reduced PAR.

The embodiments in FIG. 1 show specific realizations of described embodiments, but many other embodiments are possible. For example, for an embodiment, the PAR reduction processing is carried out both on the sub-signals that are combined to generate the output signal as well as on the combined signal. Other embodiments include PAR processing for multiple output signals. For at least some embodiments, the multiple stream processing also generates multiple output signals. For at least some of these embodiments, PAR reduction processing is carried out for each of the combined signals of the output signals. PAR reduction processing can also be carried out for each of the sub-signals that are later combined to generate the different output signals. For an embodiment where multiple output signals are generated, it is often advantageous to carry out the PAR reduction processing for both the sub-signals that are combined to generate the output signal as well as each of the combined signals.

Another embodiment includes processing of multiple input signals to generate multiple output signals based on combinations of sub-components of the input signals. In such an embodiment, representations of at least a portion of one of the input signals can be combined with other representations of at least a portion of one of the input signals to generate multiple output signals. For such an embodiment, PAR reduction processing can be applied on the sub-signals comprising a combined signal or on the combined signals' themselves, or some joint PAR reduction processing. Additionally, PAR reduction processing can also be applied to any other intermediate signal or stream in the system that is processed before the output signal is generated.

The PAR reduction processing methods can be either digital or analog, or some combination of analog and digital processing. For at least some embodiments, the PAR reduction processing is controlled by software or hardware or some combination of hardware and software. Moreover, the processing can be implemented in an open-loop manner or with some feedback and based on measurements at various places to direct the PAR reduction processing.

Figure 2:
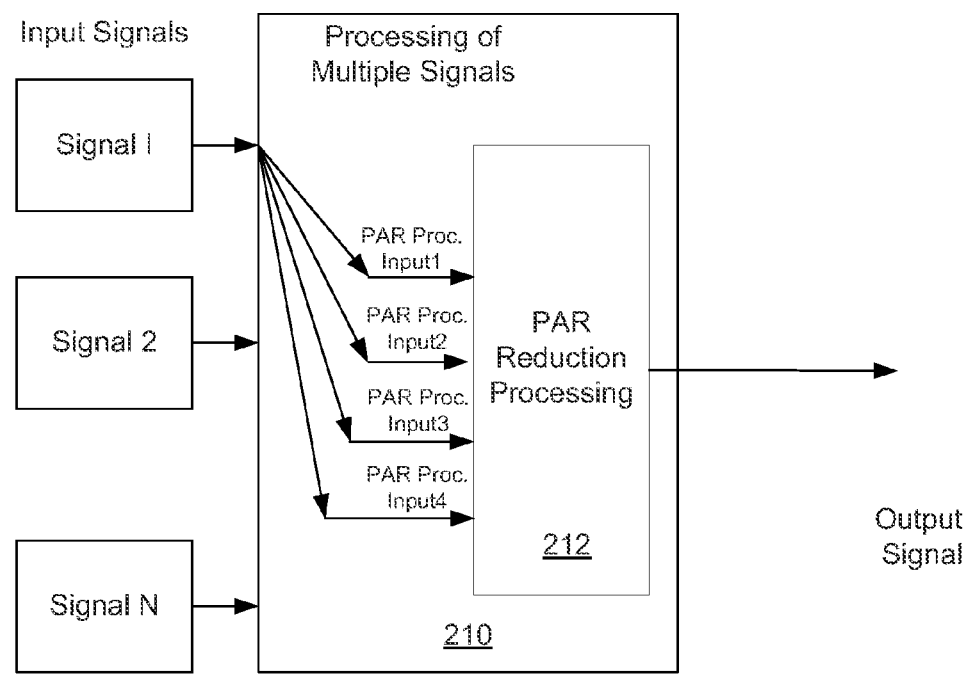
FIG. 2 shows an example of a block diagram of an embodiment for processing multiple input signals to generate an output signal that includes multiple replicates of one of the input signals, wherein each replicate occupies a different frequency sub-channel of the output signal.
Figure 2:
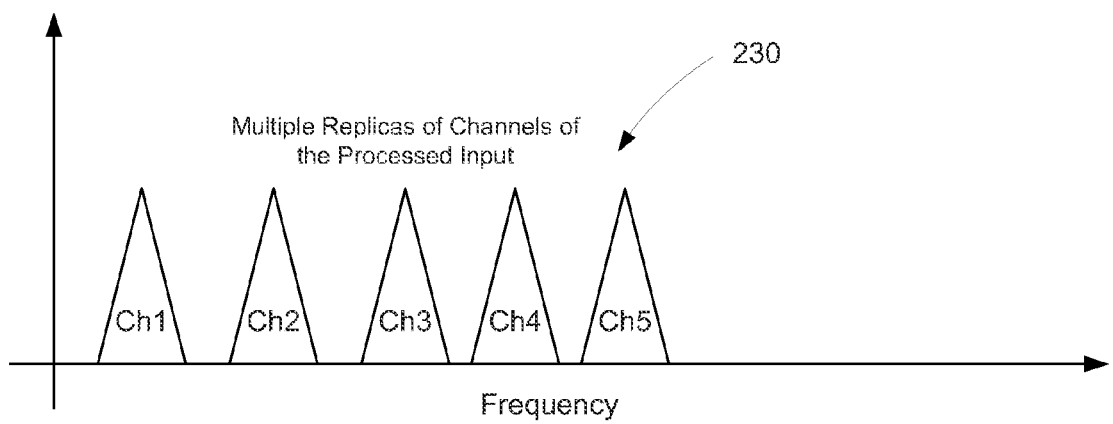

FIG. 2 shows an example of a block of an embodiment for processing of an input signal to generate an output signal that includes multiple replicates of the input signal, wherein each replicate occupies a different frequency sub-channel of the output signal.

A multiple signal processor 210 in this embodiment processes multiple representations of Signal 1. Each of the representations of Signal 1 is processed independently in 210 to reduce the PAR of the output signal. Additionally, a PAR reduction processing block 212 includes multiple PAR processing reduction inputs. The PAP processing is performed jointly on all the inputs to the PAR reduction processing block 212. For this embodiment, the multiple PAR processing inputs each receive a common signal (Signal 1) as their input.

A corresponding frequency spectrum 230 shows an example of an output signal, wherein each sub-channel of the output signal is defined by a frequency sub-channel. Each one of the sub-channels can be occupied by a frequency component of input signal 1 that is replicated, and then processed for PAR reduction of the output signal. The replication can include generating a copy of at least a portion of the input signal, wherein the portion could be generated by filtering input 1 to result in a sub-band of input 1 being replicated. In FIG. 2, each of the channels Ch1, Ch2, Ch3, Ch4, Ch5, shown in the frequency spectrum 230 is processed independently to reduce the PAR of the output signal, which is generated by combining the channels.

In another embodiment, the processing of all the inputs to the PAR reduction processing block 212 is performed independently without knowledge or cooperation of the other inputs to 212. Such processing, which could be less effective, is very simple since it is performed on individual inputs and does not require knowledge or coordination of the other inputs to the PAR reduction processing block 212. Such an approach can result in simple implementations.

For at least some embodiments, generation of a portion of input Signal 1 includes passing Signal 1 through a selective filter to select the desired portions of Signal 1. The filter can be a linear filter such as a finite-impulse-response (FIR) or an infinite-impulse response (IIR) filter. For example, a band-pass filter (BPF) selecting a desired bandwidth to be replicated is a possible embodiment for generating a portion of Signal 1. The filter can also be a non-linear filter. Moreover, the filters can be time-varying and adaptive or static and fixed. Other generation methods to generate a portion of Signal 1 is possible, such as adding a portion of Signal 1 together with a random component such that the processed signals in the PAR reduction processing block 212 are only partially correlated to each other.

Another embodiment for generation of the replicated signals includes an exact replica of the processed Signal 1 that is copied across multiple sub-channels. Further embodiments include processing two or more streams, where all sub-channels contain either the processed output of Signal 1 or the processed output of Signal 2, or the processed output of Signal 3, etc. The PAR reduction processing is then applied on all sub-channels individually or for the processed output of each Input Signal (Signal1, Signal 2, . . . , Signal N), or for the combined output of all processed streams.

It is to be understood that for embodiments, the PAR reduction processing additionally includes frequency up-conversion or a frequency shift to generate each of the output sub-channel frequencies.

In another embodiment, the processing of the PAR reduction processing block 212 is changing with time to have the desired processing for changing processing requirements. For example, measures of the PAR reduction performance can be made on the output signal or at other locations or on other signals coupled to the output signal and determine if the PAR reduction processing sufficiently reduces the PAR or if other processing in the PAR reduction processing block 212 is needed to achieve a desired PAR characteristics. Furthermore, the PAR reduction processing can be changing in response to changing conditions for the processed input signals. For example, changes in the input signal or in some of other signals processed by the system, or changes in the propagation characteristics of the input signals can require a change in the PAR reduction processing to accommodate the new situation.

Figure 3:
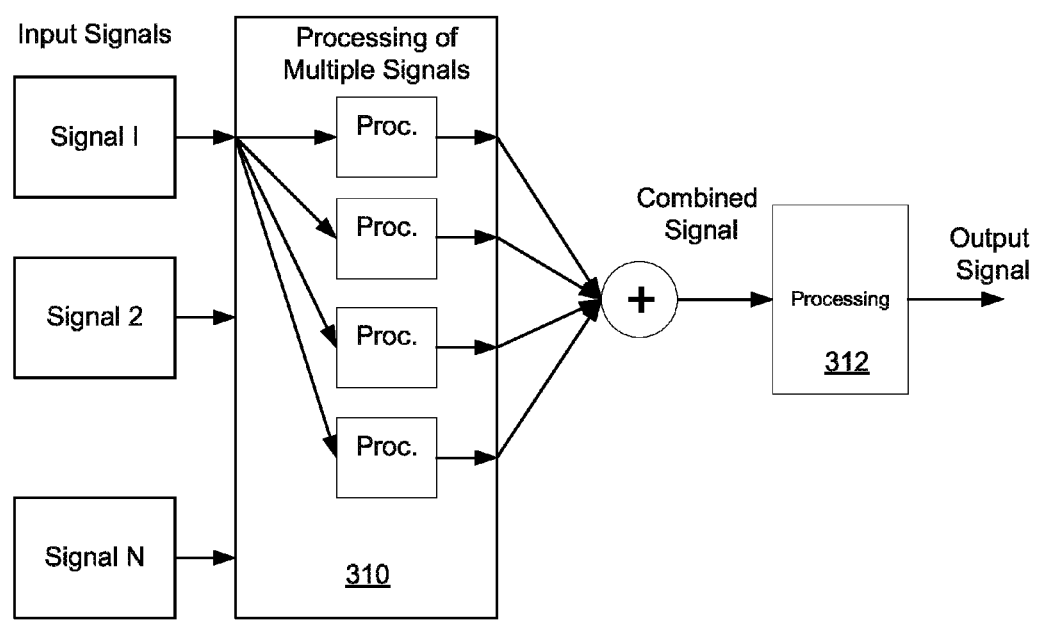
FIG. 3 shows another example of a block diagram of an embodiment for processing multiple input signals to generate an output signal that includes multiple replicates of one of the input signals.

FIG. 3 shows another example of a block diagram of an embodiment for processing multiple input signals to generate an output signal that includes multiple replicates of the input signal.

As this embodiment shows, the PAR processing (310) can be on the input signals, and the PAR processing can additionally or alternatively be on the combined signal (312). The AR processing of FIG. 3 can be advantageous since the PAR reduction approaches in 310 and 312 can be different, and each can contribute to the overall PAR reduction. In other scenarios, one of the PAR reduction processing 310 or 312 is chosen based on some criteria. For example, the processing that gives the best PAR reduction performance for the current input signal statistics is chosen to save on PAR reduction processing power and resources.

Another embodiment includes PAR reduction processing both for the sub-channels and for the combined signal because the combined signal might undergo further processing that requires additional PAR processing. Moreover, in some embodiments, the combined signal might contain sub-channels that were not processed to reduce the PAR and so it is advantageous to have PAR reduction processing for the combined signal.

For at least some embodiments, the processing 310 also includes filtering to extract the sub-channel of interest from Input 1, as well as frequency shift/up-conversion of processed signals in 310 to generate a combined signal. An example embodiment of 310 includes down-converting Signal 1 by a frequency f1, passing the down-converted signal through a low-pass filter (Pr band-pass filter) to extract a desired sub-channel, and then pass it to the PAR reduction processing unit. After PAR reduction processing the output of the processing is up-converted to a desired frequency fc1. The processing for the second processing unit in 310 proceeds in the same way except that the up-conversion frequency is fc2, and similarly for the other sub-channels generated in 310 to form the combined signal.

Besides sub-channels separated by frequency, other channelization realizations are possible, as well as other orthogonal transformations. Some example embodiments include a discrete-cosine-transform, Walsia-Haddamard transform, wavelet transforms, or filter-bank synthesis and analysis transforms.

In addition to the processing embodiments in FIG. 3, processing 310 can include other processing of the signals not for purposes of PAR reduction. Similarly, the combined signal can include further processing not related to PAR reduction to generate the output signal. The PAR reduction processing 310 and 312 depends on the other processing of the input signals. For example, embodiments of the other processing are in either time-domain processing or frequency-domain processing of the sub-channels.

Figure 4:
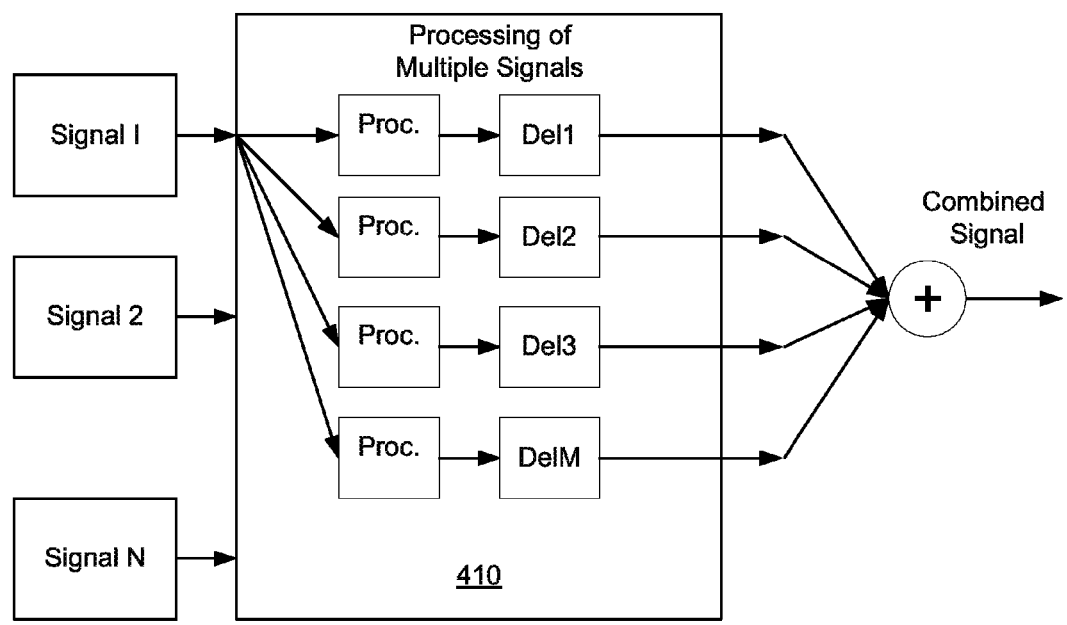
FIG. 4 shows another example of a block diagram of an embodiment for processing multiple input signals to generate an output signal that includes multiple replicates of one of the input signals.

FIG. 4 shows another example of a block diagram of an embodiment for processing multiple input signals (410) to generate an output signal that includes multiple replicates of the input signal. At least some PAR reduction processing embodiments include processing the sub-channels that are combined with a different delay for each of the sub-channels. A delay difference in sub-channels means that the sub-channel samples are different when the samples of the sub-channels are examined at the same point in time. Mathematically, the sub-channels having different delays can be represented by:

$$C1(n) = s(n - d1)$$
$$C2(n) = s(n - d2)$$
$$C3(n) = s(n - d3)$$
$$\vdots$$
$$Ck(n) = s(n - dk)$$

Where s(n) is a digital signal stream, n is the sample number, and d1, d2, dk are integers, and d1, d2, d3, dk can represent the delays Del1, Del2, Del3, DelM of FIG. 4.

The delay (Del1, Del2, Del3, DelM) of different sub-channels can be implemented in many different ways. A possible approach is to delay each individual sub-channel before it is combined with the other sub-channels. This can be implemented by having different delays of the processing paths of the sub-channels. Digital delay elements can be implemented with different number of flip-flops or digital delays in the processing path. Another possible approach is to pass each sub-channel through a filter that synthesizes a different delay for each sub-channel. The filter may also perform other functions in addition to delaying the sub-channel. For example, the sub-channel delay filter can also perform band-pass or low-pass filtering. An embodiment of such a filter includes, for example, a linear-phase filter.

At least some embodiments of the filter that introduces the different delays are a filter that is implemented as an FIR filter or an HR filter. Other embodiments are implemented by multi-rate techniques where changing the sampling rate of the signal between a few sampling rate domains is used to synthesize a delay of the processed stream. Additionally, other embodiments include a time-domain filter implementation or a frequency-domain or a block-domain filter implementation. Other embodiments include implementing the sub-channel delays using digital processing techniques or analog processing techniques or a combination of both analog and digital processing to synthesize a sub-channel delay.

At least some embodiments of the delay processing are static or, for additional flexibility, can be dynamic and changing with time based on other changing quantities. Changing the sub-channel delays can depend on the PAR reduction characteristics or can depend on processing parameters that may change with time such as the input signal characteristics or PAR characteristics, the number of sub-channels, the sub-channel arrangement, etc.

For an embodiment, coefficients of the filtering are dynamically selected based, for example, on the measured PAR of the combined signal or an output signal. Moreover, the coefficients can be dynamically adjusted slowly so as not to induce a sudden change for processing elements after the sub-channel delay processing. Further, the processing elements of the combined signal may reside in the same processing unit or can be included within further processing of a signal coupled to the combined signal. For example, if the combined signal is transmitted over a communication channel and contains a stream that is demodulated or decoded to extract the information in the stream, such a demodulator or decoder might include elements that are adjusted based on the received signal. For example, a timing-recovery system, a carrier-recovery system, an automatic gain control system (AGC), an adaptive equalization/filtering system are all sometimes adapted based on the characteristics of the received signal. As such, for an example embodiment, the changing of the sub-channel delays is performed in a sufficiently slow manner such that all the demodulator or decoder tracking loops mentioned above are capable of tracking the changes in the sub-channel characteristics without compromising the demodulated signal's quality or the error performance of the detected data.

Other embodiments that reduce the PAR by similarly de-correlating the sub-channels in time are possible, such as convolving or modulating the sub-channels with delayed or circularly shifted sequences, or modulating the sub-channels with pseudo-random sequences or streams to make the sub-channels have less statistical correlation over short-time instances, thus improving the PAR performance. The sub-channel modulation can be later removed by a device that needs to process the sub-channels by demodulating/de-correlating the sub-channels with the modulating pseudo random sequence.

Embodiments of the delay of each of the processing input signals can be implemented by a physical delay, by a filter, and/or through multi-rate processing techniques.

An embodiment includes a filter that is selected that includes linear phase over a sub-channel, but a different delay for each sub-channel.

Figure 5:
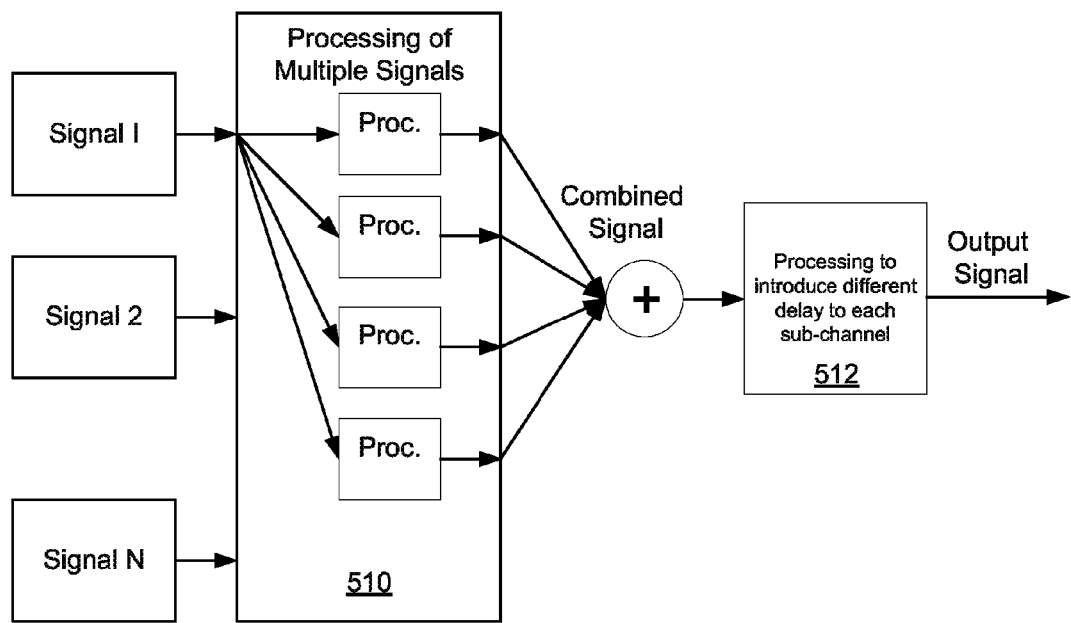
FIG. 5 shows another example of a block diagram of an embodiment for processing multiple input signals to generate an output signal that includes multiple replicates of one of the input signals.

FIG. 5 shows another example of a block diagram of an embodiment for processing multiple input signals to generate an output signal that includes multiple replicates of the input signal. This embodiment includes delay processing on the combined signal. A processing block 510 processes the sub-channels that are combined to generate the combined signal and then includes further processing by a processing device 512 that delays some of the sub-channels by different delays. This includes, for example, the selection of a special filter in 512 that delays sub-channels differently, or uses multiple IIR filters, each delaying different sub-channels by different amounts, etc.

An embodiment includes a special filter that includes linear phase over each sub-channel, but the linear-phase response over the sub-channel frequency span may delay the sub-channel frequency band by a different processing delay for each of the sub-channels. Such a filter is not the same as a classically defined FIR linear-phase filter and can be designed using other techniques. Another embodiment is to employ frequency-domain processing where different frequency-domain sub-channel processing delays are implemented for different frequency bands corresponding to the sub-channels.

The advantage of operating on the combined signal is that a single filter can simultaneously delay all the sub-channels to result in sub-channels that are delayed from each other, which often leads to improved PAR performance since the sub-channels' samples are not aligned in time anymore. Another embodiment includes dynamically changing the processing of the combined signal to introduce different delays to the different sub-channels. When implemented as a single litter, in response to changing conditions or to achieve initial good PAR reduction performance, the filter coefficients can be slowly adapted to synthesize different delays for the different sub-channels. For an example embodiment, the filter in 512 has an initial condition introducing the same delay for all sub-channels, forming a classical linear-phase FIR titter. After time, in response to more sub-channels being combined to generate the combined signal, the filter taps are slowly changed to introduce a sub-channel delay difference among the sub-channels of the combined signal. If further reduction processing is required, the filter can be further adapted to introduce larger delay differences in the sub-channels, leading to more PAR reduction.

The filter changes can be carried out in a slow enough manner to make sure that other elements that process the combined signal are not overwhelmed by the speed of changes in the combined signal. For an embodiment, the change of the filter coefficients are based on an adaptive numerical algorithm that attempts to reduce the PAR.

Figure 6:
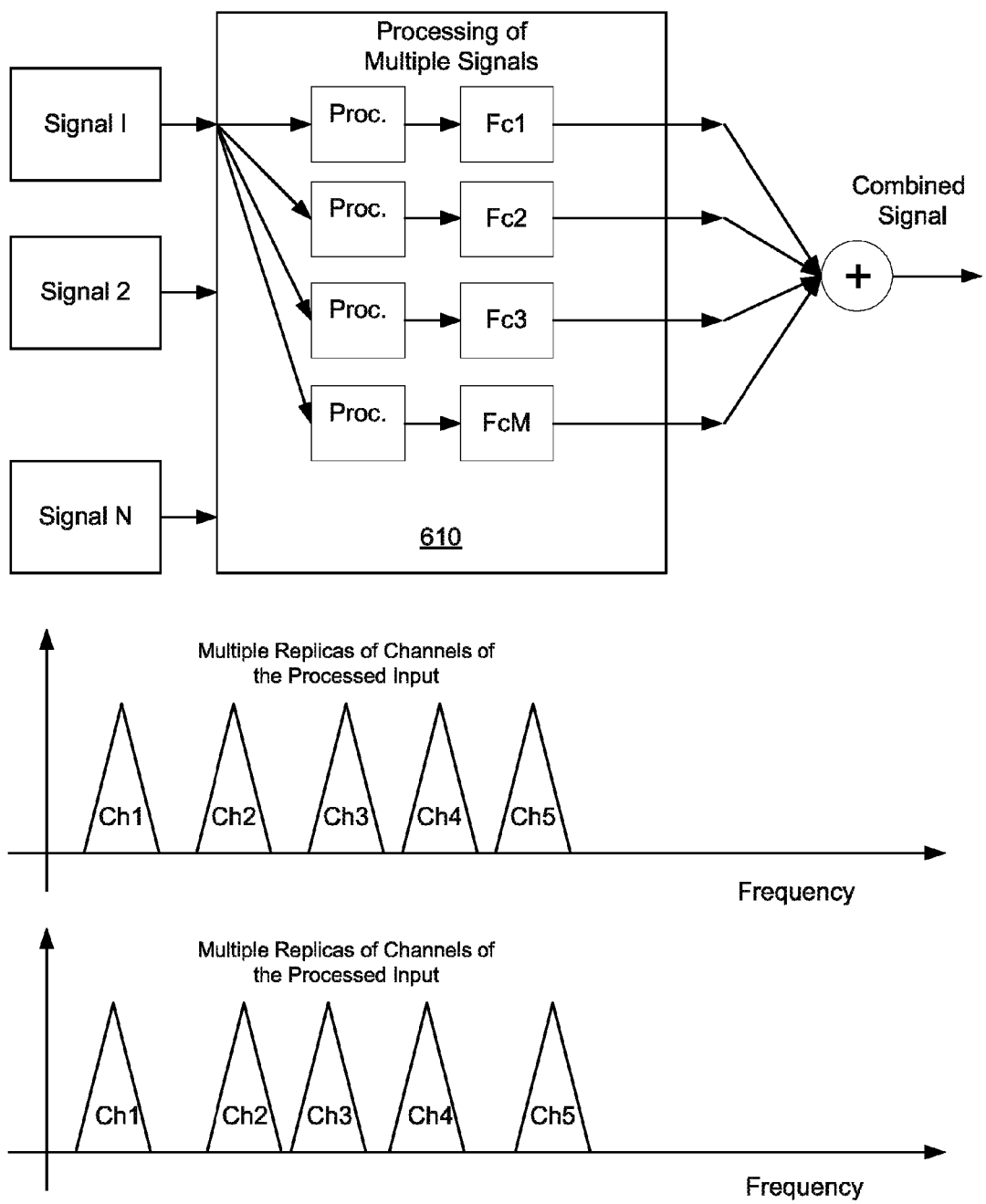
FIG. 6 shows another example of a block diagram of an embodiment for processing multiple input signals to generate an output signal that includes multiple replicates of one of the input signals, wherein each replicate occupies a different frequency sub-channel of the output signal, and has an adjusted center frequency.

FIG. 6 shows another example of a block diagram of an embodiment for processing multiple input signals (610) to generate an output signal that includes multiple replicates of the input signal, wherein each replicate occupies a different frequency sub-channel of the output signal, and has an adjusted center frequency. As shown, the center frequencies of the sub-channels are purposely offset from an initial condition, which results in a combined signal signature that reduces the PAR.

For embodiments, the center frequencies can be chosen randomly or deterministically. For example, a given standard sub-channel frequency mapping is given by:

$Fc1=F1+D, Fc2=F2+2D, \ldots, \ldots, FcM=F0+(M-1)D$, where $Fc1, Fc2, Fc3$ are center frequencies for different sub-channels in some frequency measurement unit such as Mega Hertz (MHz).

Embodiments include shifting the center frequencies to reduce the PAR, wherein the center frequencies are shifted, for example, to:

$Fc1=Fa+D+Fc2=F1+2D+g2, \ldots, \ldots, FcM=F1+(M-1)D+gM$, where the $gi$'s represent frequency deviations (in MHz) from the center frequencies that are chosen to reduce the PAR of combined signal.

For an embodiment, the frequency shifts for the sub-channels given by $gi$ for Rib-channel $i$, can be chosen by many methods. For an embodiment, the $gi$'s are chosen at random over an allowed frequency shift range and independently for each sub-channel $i$. The $gi$'s could also be jointly determined to result in a deterministic frequency shift pattern that reduces the PAR of the combined signal. Other embodiments include having only a few possible frequency shift values, meaning that the $gi$'s are chosen from a finite set of frequency-shift choices.

For embodiments, the frequency shift $gi$ for sub-channel $i$ can be implemented in many ways, using time-domain processing or frequency domain processing. For an embodiment, a time-domain approach uses the frequency up-conversion or down-conversion processing to introduce an additional frequency shift equal to $gi$ for sub-channel $i$. For example, assuming that the sub-channel is centered at a frequency of 0-MHz before being placed at the center frequency of $Fci$, a frequency up-conversion would up-convert the baseband sub-channel location to a center frequency of $Fci$ MHz. To implement the center frequency shift, the up-conversion frequency could be made equal to $Fci+gi$.

For an embodiment, the sub-channel center frequency shift is carried out using frequency-domain methods. For example, a center frequency shift can be easily performed in the frequency domain by mapping a set of frequency-domain tones/bins to different locations to induce an effective frequency-shift of the tones/bins belonging to a sub-channel. For another embodiment, the center frequency shift can be implemented in many possible transform domains. For example, such a center frequency shift could be implemented at the output of a filter-bank analysis processing by modifying the output channels or tones of the filter-bank analysis stage.

Another embodiment includes dynamically changing the sub-channel center frequency shifts. Changing the sub-channel center frequency can be implemented based on measurements of the PAR reduction performance and adjusting the frequency shifts of some of the sub-channels to reduce further the combined signal's PAR. Changes in the center frequency shifts can also be initiated based on changes in the processed streams such as a change in the input stream characteristics or environmental changes such as temperature or transmitted or received power changes, or a change in the number of processed streams or in their center frequencies. For a further embodiment, the center frequency changes can be carried out in a sufficiently slow manner so as not to overwhelm other processing devices that process sub-channels of the combined signal. For example, a carrier recovery loop for the sub-channel processing usually tracks the center frequency of a sub-channel of the combined signal. Such tracking of the center frequency needs to be maintained so the change in center frequency to reduce the PAR must be carried out at a slow rate so that the carrier tracking of a sub-channel can be accomplished without incurring any fidelity or performance degradation.

Figure 7:
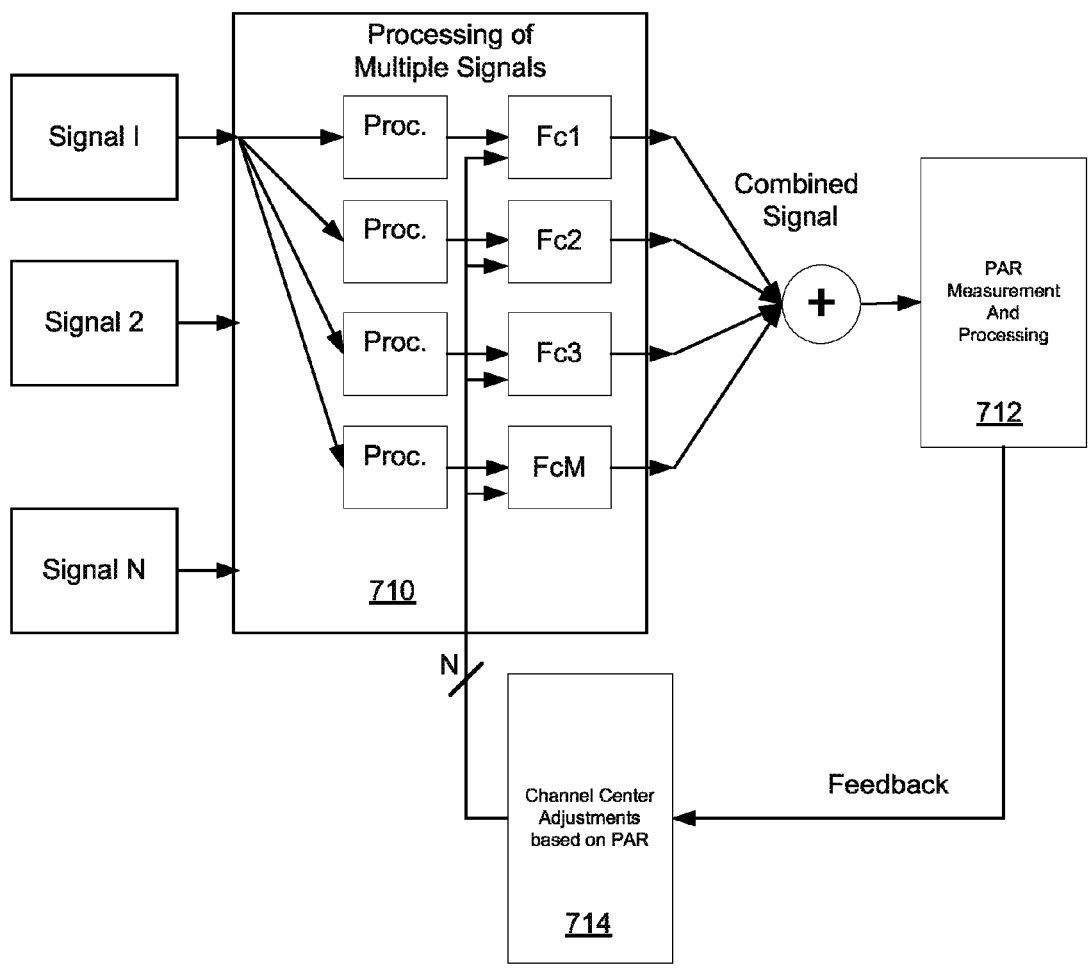
FIG. 7 shows an example of a block diagram of an implementation of the embodiment of FIG. 6, wherein the center frequency of each sub-channel is influenced by a PAR measurement and feedback.

FIG. 7 shows an example of a block diagram of an implementation of the embodiment of FIG. 6, wherein the center frequency of each sub-channel is influenced by a PAR measurement 712 and feedback 714. The previously described center frequencies are selected based on the PAR measurements and feedback through selection, for example, of the set of $gi$'s within the processing of the multiple signals (710).

For an example embodiment, the sub-channel center frequencies placement is restricted by other restrictions such as a Rib-channel frequency mapping plan, Doppler shift affects, frequency uncertainty due to imprecise clocks/timing devices, etc., and so the center frequency shifts performed to reduce the PAR are restricted to a limited frequency range.

For an embodiment, the PAR measurement can be made on the combined signal, the output signal, or any signal that is coupled to those signal in any way. For example, the PAR can be measured in the analog or digital domain or at a different location. The PAR measurement may be a simple threshold counter, counting the number of times the signal's amplitude exceeded a pre-defined threshold in a specified period of time. Other measures include gathering statistics of the signal over a period of time and analyzing the statistical distribution of the amplitude of the signal. Many other PAR measures are possible that are known in the art.

For an embodiment, the PAR characteristics that are measured in 712 are feedback to 714, where these measurements may be used to adjust the PAR reduction processing to induce a change to the PAR characteristics measured in 714. Such a process is used, for example, to achieve a good PAR reduction solution by varying the center frequency shifts of sub-channels processed in 710. Starting from an initial center frequency shifts, the center frequencies of the sub-channels are changed, followed by a PAR measurement in 712, feeding the information back to 714, and the processing in 714 deciding on the next sub-channel frequency adjustment based on the measured PAR characteristics.

For another embodiment, when the number of sub-channel changes because of changes in the processing requirement for the multi-stream processing system, new sub-channels could be added to the processing. Following the addition of these sub-channels to the processing, the PAR characteristics are measured in 712, followed by 714 adjusting the center frequencies of the new sub-channels and the old sub-channels to reduce the PAR of the new combined signal.

Figure 8:
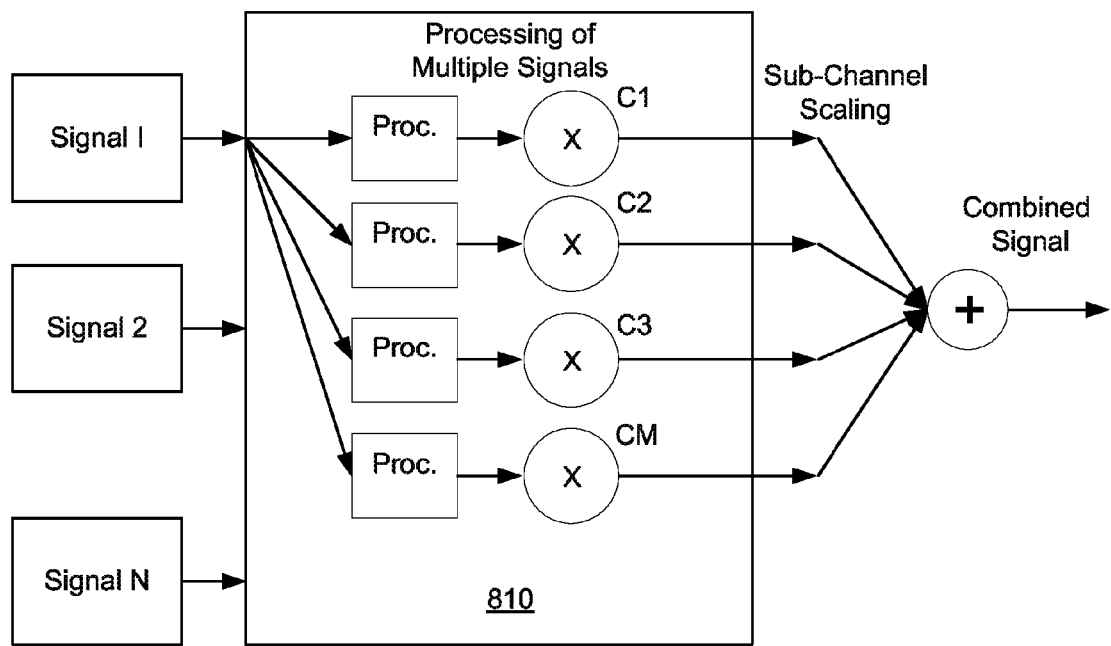
FIG. 8 shows another example of a block diagram of an embodiment for processing multiple input signals to generate an output signal that includes multiple replicates of one of the input signals.

FIG. 8 shows another example of a block diagram of an embodiment for processing multiple input signals to generate an output signal that includes multiple replicates of the input signal. For this embodiment, the multiple signal processing (810) includes multiplying each of the sub-channels with a multiplier (C1, C2, C3, . . . , CM) to reduce the PAR of the combined signals.

For at least some embodiments, the processing includes scaling at least one of the sub-channels differently than at least one other sub-channel. For a specific embodiment, the scaling includes at least one inversion. For embodiments, the different processing for each sub-channel can be a different filter, or a different scaling of the stream's sub-channel, or simply changing the polarity/sign of all the samples composing the stream (equivalent to multiplying the stream by +1 or −1). Also, if the stream processing is performed with the complex baseband representation of the waveform, the scaling factors can be complex numbers (with real and imaginary components).

The scaling can be implemented in many different ways, including using digital or analog processing. The scaling can be implemented using time domain processing or using frequency-domain processing. For an embodiment, the processing of individual sub-channels includes a scaling of the sub-channel. For an embodiment, a filter used for the sub-channel processing allows for implementing an additional scaling of the sub-channel.

For another embodiment, in frequency-domain processing or block-domain processing, the channel scaling is implemented in the frequency-domain by scaling the frequency-domain tones/bins, etc.

For another embodiment, the scaling of the sub-channels is implemented using the sub-channel down-conversion or up-conversion processing of the sub-channels. For example, the phase of the up-conversion or down-conversion phasor can be changed or modified to result in implementing a phase shift of the sub-channel. For another embodiment, the phase change in the up-conversion or down-conversion phasor is done by delaying the phasors differently across the sub-channels.

For a specific embodiment, the scaling multipliers include a 1 or a −1. For an embodiment, the scaling could be random scaling or deterministic scaling. Random scaling could be a random choice of 1 or −1 or scaling based on a random scaling from a bounded set. For the sub-channel scaling, the scaling could be done independently for each sub-channel or it could be jointly coordinated and carried out for each sub-channel. Jointly determining the scaling of the sub-channels could lead to more PAR reduction than performing scaling independently for each sub-channel.

For another embodiment, the sub-channel scaling is performed by processing of the combined signal. For another embodiment, the same scaling values are used for different sub-groups of the sub-channels. For example, a filter processing the combined signal can filter different groups of sub-channels with a different scaling factor.

For another embodiment, the scaling is dynamic and adaptive based on the PAR measurements or other criteria. The scaling coefficients could be changed at a pre-determined rate not to overwhelm other processing elements. They could be changed based on feedback from a PAR measurement or based on some other adaptive algorithm.

Figure 9:
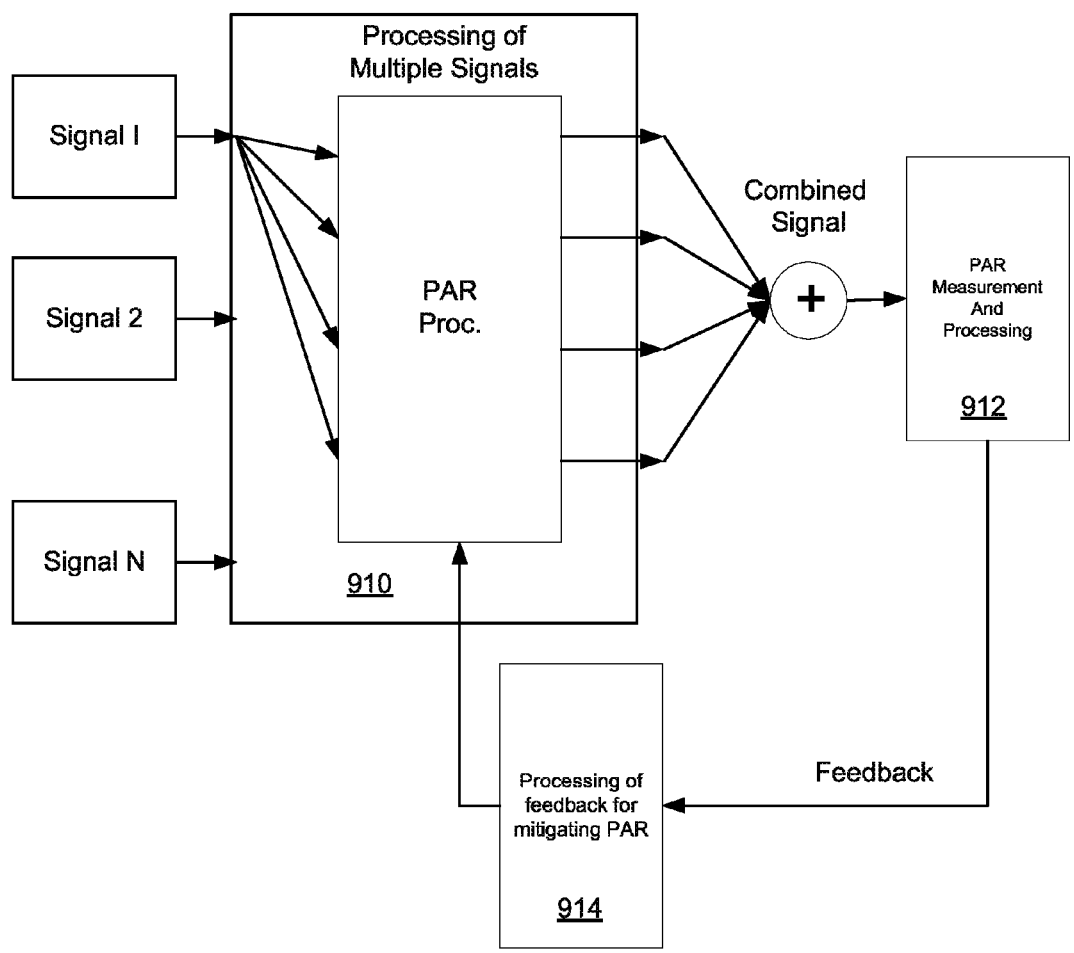
FIG. 9 shows an example of a block diagram of an embodiment wherein processing of each sub-channel is influenced by a PAR measurement and feedback.

FIG. 9 shows an example of a block diagram of an embodiment wherein processing of each sub-channel is influenced by a PAR measurement and feedback. A PAR measurement is made by a PAR measurement unit 912. For an embodiment, the measurement is performed on the combined signal. For other embodiments, the measurement is carried out on other signals coupled to the combined signal and at different locations. The measurement can also be carried at multiple locations and all the measurements can be used to adjust the PAR processing. For example, the measurement can be done after further processing of the combined signal, such as further filtering, or up-conversion, or in the analog domain. The PAR measurement can also be carried out at locations such as a demodulator or processor that processes that combined signal after it has been sent to a different location for further processing.

The measurement is sent to processing block 914, where the PAR measurement result are processed and analyzed. The processing in 914 can take action to change the PAR processing 910 to achieve a desired PAR characteristic at the various measurement points in 912. The processing of the PAR measurement can result in, for example, changing the PAR processing. For embodiments, the center frequencies of sub-channels are modified, or the sub-channel scaling is changed, or the filtering of the sub-channels is changed to change the PAR characteristics.

The PAR processing changes in 910 directed by 914 can be performed in many different ways to accommodate many possible situations. The changes are performed at a rate of change that is slow so that further processing of the combined signal is not degraded. Or it can be performed by coordination with other processing elements.

For at least some embodiments, the PAR feedback can be used to adjust coefficients dynamically at a "slow rate", so as not to hurt other receivers or modems. Such modems or other receivers expect changes in the signal they process to be changing at a very stow rate so that the processing can be adjusted slowly to track the changes in the received signal. In another embodiment, the unit 914 communicates the changes in PAR processing it is going to perform to other processing elements that process the combined signal so that the other processing units are aware of changes in the combined signal and can adjust their processing accordingly.

Figure 10:
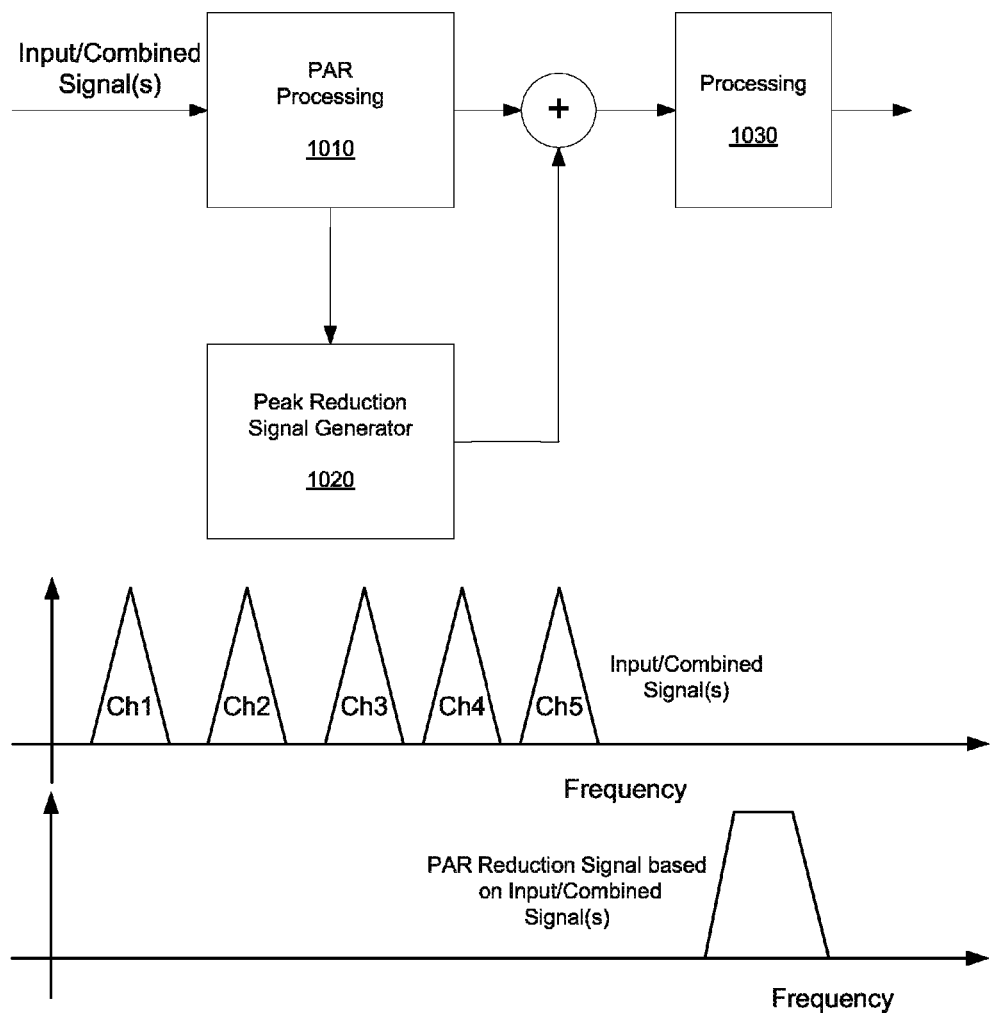
FIG. 10 shows another example of a block diagram of an embodiment for processing multiple input signals to generate an output signal that includes multiple replicates of the input signal, and further includes a peak reduction cancellation signal for reducing PAR of the output signal.

FIG. 10 shows another example of a block diagram of an embodiment for processing multiple input signals to generate an output signal that includes multiple replicates of the input signal, and further includes a peak reduction cancellation signal for reducing PAR of the output signal. In FIG. 10, PAR processing 1010 performs processing to reduce the PAR of the combined signal. Unit 1020 adds a peak-reduction signal to the output of the PAR reduction processing 1010. The peak reduction signal generated by 1020 is added/coupled to the output of 1010 to generate an output signal that includes a peak-reduction signal.

The peak-reduction signal generator processes the combined signal that is the output of the PAR reduction processing 1010. The peak-reduction generation uses the combined signal to generate the peak-reduction signal. Many methods of generation of the peak-reduction signal are possible. For embodiments, the processing can be linear or non-linear. For an embodiment, the peak-reduction processing generates a new frequency component that is added to the output of 1010. For another embodiment, processing 1020 solves a numerical optimization problem to generate a peak reduction signal subject to various constraints.

For another embodiment, the peak reduction signal is a scaled and frequency shifted sub-channel of one or more of the sub-channels processed by the multi-stream processing engine. For example, a sub-channel is frequency shifted and then multiplied by −1. For another embodiment, the peak-signal generation uses a frequency plan to place the PAR reduction signal in a location that does not interfere with the transmission of any information by the processing system or other communication systems sharing the medium. For an embodiment, the peak reduction signal is placed in frequency between sub-channels where there is no information present. For an embodiment, the power of the peak-reduction signal is bounded so as not to increase the power of the combined signal.

FIG. 10 also shows an embodiment of a frequency-domain view of a peak-reduction signal that is added to a combined signal that is composed of five frequency sub-channels. The peak-reduction signal is added at a frequency location that is not occupied by any sub-channel. This allows for the peak reduction signal to be easily filtered out by a frequency selective filter later on so that the peak-reduction signal does not interfere with any further processing of the sub-channels. In FIG. 10, the peak-reduction signal is added at a higher frequency location than the last sub-channel, in this case sub-channel 5, in the combined signal.

For an example embodiment, the peak reduction signal occupies multiple frequency-domain locations and does not have to be contained in one contiguous frequency band.

For an embodiment, the generated peak-reduction signal generation depends on the combined signal, on the frequency plan, on FCC restrictions, on the available bandwidths, the sub-channel frequency spacing, etc.

For another embodiment, the peak-reduction generation is combined with other PAR reduction processing such as scaling or sub-channel center frequency shifting, where the PAR reduction processing of both methods could be done jointly for added PAR reduction performance.

For at least some embodiments, the processing 1030 further includes the elimination of the peak reduction signal that was added, and/or the processing can include further processing. For another embodiment, the processing 1030 is included at a receiver of the output signal which removes peak reduction signal before processing the sub-channels of interest. Embodiments of the removing of the peak reduction signal can be implemented in either the digital or analog domain at multiple locations.

Figure 11:
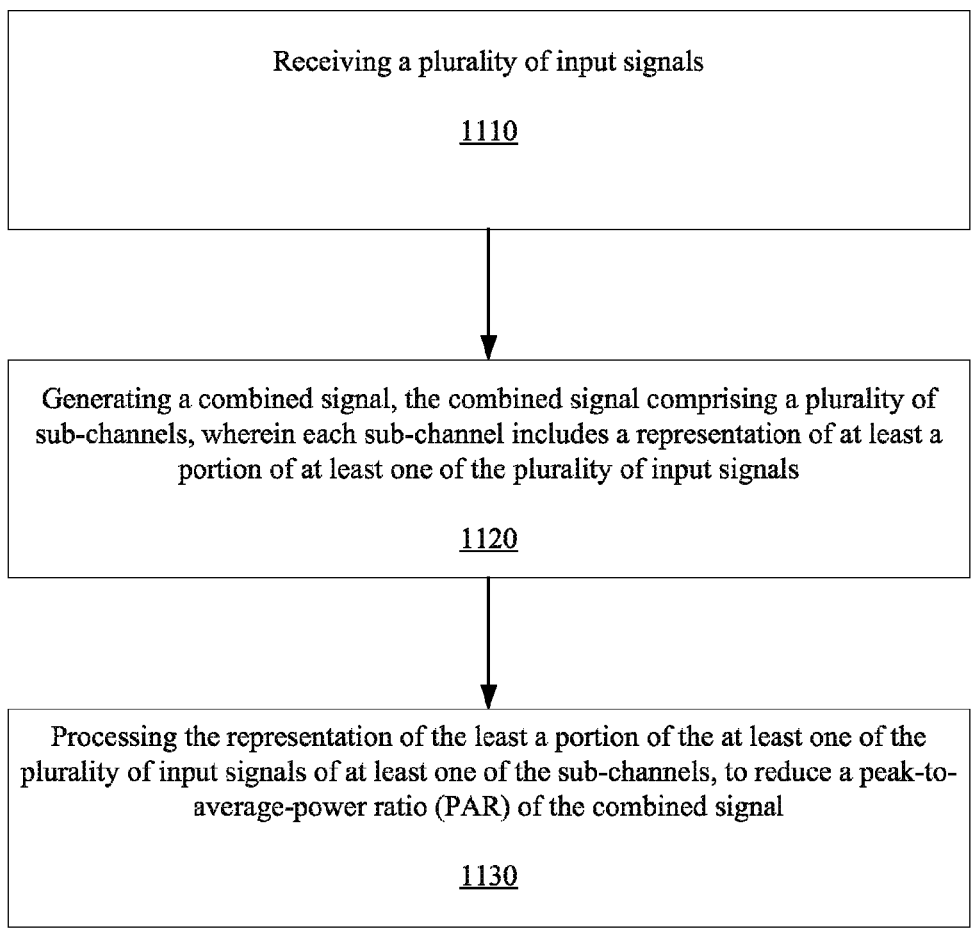
FIG. 11 is a flow chart that includes step of an example of a method of processing input signals to generate a combined signal.

FIG. 11 is a flow chart that includes step of an example of a method of processing input signals to generate a combined signal. A first step 1110 includes receiving a plurality of input signals. A second step 1120 includes generating a combined signal, the combined signal comprising a plurality of sub-channels, wherein each sub-channel includes a representation of at least a portion of at least one of the plurality of input signals. A third step 1130 includes processing the representation of the least a portion of the at least one of the plurality of input signals of at least one of the sub-channels, to reduce a peak-to-average-power ratio (PAR) of the combined signal.

The combined signal includes the plurality of sub-channels. For embodiments, the final output signal can be either the combined signal, or the combined signal after further processing.

For an embodiment, the processing includes applying a different delay to each of the sub-channels. As described, the delays of the different sub-channels can be introduced either before or after combining the sub-channels. As described, the delays are introduced to reduce or minimize PAR of the combined or output signal. As described, for at least one embodiment, the phase delays are adaptive, and can be selected, for example, by measuring and/or monitoring the PAR of the combined or the output signal. The different delays of each of the sub-channels can be applied by selective filtering of the combined signal. For at least some embodiments, the delay includes a phase delay or a time delay.

For at least one embodiment, each sub-channel occupies a different frequency band, and the processing includes re-aligning a center frequency at least one of the sub-channels. For another embodiment, the re-alignment of each of the sub-channels is random or deterministic. For an embodiment, the re-alignment of each of sub-channels is adaptive and, for example, based on at least one of a PAR measurement or a sub-channel frequency plan. As previously described, the re-alignment can be adaptively selected based on feedback of measurement of the PAR or the monitored PAR of the combined and/or output signals. An embodiment further includes independently or jointly re-aligning the at least one sub-channel to reduce the PAR.

For at least some embodiments, the processing includes scaling at least one of the sub-channels differently than at least one other sub-channel. For a specific embodiment, the scaling comprises at least one inversion. For embodiments, the different processing for each sub-channel can be a different filter, or a different scaling of the stream's sub-channel, or simply changing the polarity/sign of all the samples composing the stream (equivalent to multiplying the stream by +1 or −1). Also, if the stream processing is performed with the complex baseband representation of the waveform, the scaling factors can be complex numbers (with real and imaginary components).

At least one embodiment includes generating a peak-reduction signal, and adding the peak-reduction signal with the combined signal, thereby reducing the PAR of the combined signal. In a further embodiment, the PAR-reduction signal is added to reduce a specific function of the PAR or to improve the average PAR. Moreover, any processing of the signal in the future can be aware of the added PAR-reduction signal and can remove it prior to further processing of the received signal. The PAR-reduction signal can be generated from the plurality of input signals.

For at least some embodiments, the processing the representation of the least a portion of the at least one of the plurality of input signals of at least one of the sub-channels adaptively changes based on a number of sub-channels of the combined signal. For an embodiment, the processing of the representation of the least a portion of the at least one of the plurality of input signals of at least one of the sub-channels adaptively changes based on a statistical correlation of the input signals.

In a further embodiment, the PAR/peak amplitude reduction algorithm is dynamic and flexible, and can change in response to changes in the stream's configuration/processing requirements such as dynamic changes in the number of sub-channels being simultaneously processed, an addition or removal of a channel. For example, based on the current number of replicated sub-channels, the filter coefficients of the stream that induce different delays for each sub-channel can be modified dynamically based on the number of replicated sub-channels and non-replicated sub-channels and, possibly, other factors, such as the processed stream's power or other statistical measures.

For at least some embodiments, processing the representation of the least a portion of the at least one of the plurality of input signals of at least one of the sub-channels adaptively changes based on desired PAR characteristics of the combined signal. In a farther embodiment, there exist counters that measure the peak-excursion or PAR level of the processed stream and based on the PAR conditions, the processing parameters are changed to result in the desired PAR characteristics.

For at least some embodiments, the processing of the representation of the least a portion of the at least one of the plurality of input signals of at least one of the sub-channels adaptively changes, wherein a rate of the changes is based at least in part upon characteristics of a receiver of a signal that is based on the combined signal. In a further embodiment, the filter coefficients that are modified dynamically to respond to changes in the PAR characteristics based on the change in the stream characteristics are changed at a pre-determined rate to result in very gradual changes to the filtering of the stream such that later systems extracting information from the streams would not suffer a distortion because of the sudden change in the processing of the stream but will have sufficient time to adjust their processing to accommodate the change in the processed stream that is performed to reduce the stream's PAR characteristics.

Although specific embodiments of the invention have been described and illustrated, the invention is not to be limited to the specific forms or arrangements of parts so described and illustrated. The invention is limited only by the appended claims.

What is claimed is:

1. A method of processing input signals, comprising; receiving a plurality of input signals, at least one of the received plurality of input signals including a plurality of replicated sub-channels; generating a combined signal, the combined signal comprising the plurality of replicated sub-channels; processing the plurality of input signals to generate an output signal that includes the plurality of replicated sub-channels, to reduce a peak-to-average-power-ratio (PAR) of the combined signal; generating a peak-reduction signal; and adding the peak-reduction signal with the combined signal, thereby reducing the PAR of the combined signal.

2. The method claim 1, wherein the processing comprises applying a different delay to each of the sub-channels.

3. The method of claim 2, further comprising selecting each of the different delays to mitigate the peak-to-average-power-ratio (PAR) of the combined signal.

4. The method of claim 2, wherein each of the different delays of each of the sub-channels is applied before generating the combined signal.

5. The method of claim 2, wherein each of the different delays of each of the sub-channels is applied after generating the combined signal.

6. The method of claim 5, wherein the different delays of each of the subchannels are applied by selective filtering of the combined signal.

7. The method of claim 1, wherein each sub-channel occupies a different frequency band, and further comprising; re-aligning a center frequency of at least one sub-channel.

8. The method of claim 7, wherein the re-alignment of the center frequency of the at least one sub-channel is adaptive based on at least one of a PAR measurement, or a sub-channel frequency plan.

9. The method of claim 7, wherein the re-alignment of the center frequency of the at least one sub-channel is random or deterministic.

10. The method of claim 7, further comprising independently or jointly realigning the at least one sub-channel to reduce the PAR.

11. The method of claim 1, further comprising scaling at least one of the subchannels differently than at least one other sub-channel.

12. The method of claim 11, wherein scaling comprises an inversion.

13. The method of claim 1, further comprising generating the peak reduction signal from the plurality of input signals.

14. The method of claim 1, wherein the processing the plurality of input signals adaptively changes based on a number of sub-channels of the combined signal.

15. The method of claim 1, wherein the processing the plurality of input signals adaptively changes based on a statistical correlation of the input signals.

16. The method of claim 1, wherein the processing the plurality of input signals adaptively changes based on desired PAR characteristics of the combined signal.

17. The method of claim 1, wherein the processing the plurality of input signals adaptively changes, wherein a rate of the changes is based at least in part upon characteristics of a receiver of a signal that is based on the combined signal.

18. An apparatus for processing input signals, comprising; a multi-stream processing system configured to receive a plurality of input signals and generate a combined signal, wherein the combined signal includes a plurality of replicated sub-channels, wherein each replicated sub-channel includes a representation of at least a portion of at least one of the plurality of input signals; signal processing circuitry configured to process the representation of the least a portion of the at least one of the plurality of input signals of at least one of the subchannels to reduce a peak-to-average-power ratio (PAR) of the combined signal, generate a peak-reduction signal and add the peak-reduction signal with the combined signal, thereby reducing the PAR of the combined signal.

19. The apparatus of claim 18, wherein the signal processing circuitry applies a different delay to each of the sub-channels.

20. The apparatus of claim 19, further comprising selecting each of the different delays to mitigate the peak-to-average-power-ratio (PAR) of the combined signal.

21. The apparatus of claim 19, wherein each of the different delays of each of the sub-channels is applied before generating the combined signal.

22. The apparatus of claim 19, wherein each of the different delays of each of the sub-channels is applied after generating the combined signal.

23. The apparatus of claim 22, wherein the different delays of each of the subchannels are applied by selective filtering of the combined signal.

24. The apparatus of claim 18, wherein each sub-channel occupies a different frequency band, and further comprising; re-aligning a center frequency of at least one sub-channel.

25. The apparatus of claim 24, wherein the re-alignment of each of sub-channel is adaptive based on at least one of a PAR measurement, or a sub-channel frequency plan.

26. The apparatus of claim 24, wherein the re-alignment of each of the plurality sub-channels is random or deterministic.

27. The apparatus of claim 18, further comprising; the processing circuitry inverting at least one of the plurality of sub-channels.

28. The apparatus of claim 18, further comprising the processing circuitry configured to generate the peak reduction signal from the plurality of sub-channels.

29. The apparatus of claim 18, wherein the processing the representation of the least a portion of the at least one of the plurality of input signals of at least one of the sub-channels adaptively changes based on a number of sub-channels of the combined signal.

30. The apparatus of claim 18, wherein the processing the representation of the least a portion of the at least one of the plurality of input signals of at least one of the sub-channels adaptively changes based on desired PAR characteristics of the combined signal.

31. The apparatus of claim 18, wherein the processing the representation of the least a portion of the at least one of the plurality of input signals of at least one of the sub-channels adaptively changes, wherein a rate of the changes is based at least in part upon characteristics of a receiver of a signal that is based on the combined signal.

32. A method of processing input signals, comprising; receiving a plurality of input signals; generating a combined signal, the combined signal comprising a plurality of replicated sub-channels, wherein each sub-channel includes a representation of at least a portion of at least one of the plurality of input signals; processing the combined signal to reduce a peak-to-average-power ratio (PAR) of the combined signal; generating a peak-reduction signal; and adding the peak-reduction signal with the combined signal, thereby reducing the PAR of the combined signal.

* * * * *